US005337079A

United States Patent [19]

Spehrley, Jr. et al.

[11] Patent Number: 5,337,079

[45] Date of Patent: Aug. 9, 1994

[54] POST-PROCESSING OF COLORED HOT MELT INK IMAGES

[75] Inventors: Charles W. Spehrley, Jr., Hartford; Paul A. Hoisington, Norwich, both of Vt.; Steven J. Fulton, Hanover, N.H.; Lawrence R. Young, West Lebanon, N.H.; Robert R. Schaffer, Canaan, N.H.

[73] Assignee: Spectra, Inc., Hanover, N.H.

[21] Appl. No.: 532,206

[22] Filed: Jun. 1, 1990

Related U.S. Application Data

[63] Continuation-in-part of Ser. No. 202,488, Jun. 3, 1988, Pat. No. 4,951,067, which is a continuation-in-part of Ser. No. 94,664, Sep. 9, 1987, Pat. No. 4,751,528, and a continuation-in-part of Ser. No. 416,158, Oct. 2, 1989, Pat. No. 5,023,111, which is a continuation-in-part of Ser. No. 230,797, Aug. 10, 1988, Pat. No. 4,873,134.

[51] Int. Cl.5 .......................... G01D 15/16; B41J 2/01

[52] U.S. Cl. ...................................................... 347/88

[58] Field of Search ................. 346/140, 1.1; 400/126; 428/207, 913; 427/366, 369, 370

[56] References Cited

U.S. PATENT DOCUMENTS 4,853,706 8/1989 Van Brimer et al. ................ 346/1.1

FOREIGN PATENT DOCUMENTS 0308117 3/1989 European Pat. Off. .

*Primary Examiner*—Mark J. Reinhart

*Attorney, Agent, or Firm*—Brumbaugh, Graves, Donohue & Raymond

[57] ABSTRACT

In the particular embodiments of the invention described in the specification, the surface of a hot melt ink image in a projection transparency having curved surface portions is reoriented to provide an ink layer of substantially uniform thickness causing rectilinear transmission of light rays passing through the transparency and provide a clear, saturated projection image. Reorienting of the curved surface portion to provide a layer of uniform thickness is accomplished by burnishing, pressing with or without heating, rolling with or without heating, or heating the ink to a temperature above its melting point for a selected time such as 0.5 to 10 seconds. Preferably, the ink is cooled rapidly after remelting to reduce crystallization and frosting and thereby reduce light transmission losses in the ink.

40 Claims, 4 Drawing Sheets

POST-PROCESSING OF COLORED HOT MELT INK IMAGES

REFERENCE TO RELATED APPLICATIONS

This application is a continuation-in-part of the copending application of Charles W. Spehrley, Jr., Ser. No. 07/202,488 filed Jun. 3, 1988, for "CONTROLLED INK DROP SPREADING IN HOT MELT INK JET PRINTING", now U.S. Pat. No. 4,951,067 which is a continuation-in-part of the application of Spehrley, Jr. et al., Ser. No. 07/094,664 filed Sep. 9, 1987, for "PLATEN ARRANGEMENT FOR HOT MELT INK JET APPARATUS" which issued as U.S. Pat. No. 4,751,528 on Jun. 14, 1988. This application is also a continuation-in-part of the copending Fulton et al. application Ser. No. 07/416,158, filed Oct. 2, 1989, for "TREATMENT OF HOT MELT INK IMAGES", now U.S. Pat. No. 5,023,111 which is a continuation-in-part of the Fulton et al. application Ser. No. 07/230,797, filed Aug. 10, 1988, for "HOT MELT INK PROJECTION TRANSPARENCY", which issued as U.S. Pat. No. 4,873,134 on Oct. 19, 1989.

BACKGROUND OF THE INVENTION

This invention relates to colored hot melt ink images and, more particularly, to processing of transparent colored hot melt ink images after they have been printed to provide improved image quality.

Hot melt inks, also known as phase-change inks, are used in thermal transfer printers and in certain ink jet printers. The characteristic of these inks is that they are solid at room temperature, liquefied by heating for marking, and resolidified by freezing on the marked substrate.

A transparent colored hot melt ink image, such as a subtractive color image composed of cyan, magenta and yellow inks, created on the surface of a substrate may be composed of individual drops of the ink as supplied in the ink jet drop-generating process, couples of drops, lines of drops or large areas covered completely by drops. Even when the entire surface of a portion of the substrate is covered with ink, the surface of the ink tends to retain the curvature of the individual drops. Light passing through the surface of the deposited ink is refracted by the local curvature of the ink surface.

A first deficiency of transparent colored ink images having such curved surfaces occurs in the projection of color transparencies because the light is deflected by the curved surface portions from its original direction and may be lost from the optical path of the projection apparatus. The projected image of this area of the transparency appears dark. If the layer of ink has a substantially uniform thickness, light passes through the substrate and the ink in a rectilinear manner and no light is lost by refraction. Consequently, all of the light is collected by the projection lens. Hence it is advantageous if the curvatures of contiguous drops forming the region of the ink image are eliminated over the entire surface of the solid areas of the image. For individual drops of specified volume, a large radius of curvature corresponds to a small contact angle between the ink surface and the transparency substrate, as described in the Fulton et al. U.S. Pat. No. 4,873,134, the disclosure of which is incorporated by reference herein.

In the case of black-and-white transparencies, the major concern is that the deposited ink be able to block or reduce transmission of light through the transparency. However, for the projection of colored images, it is necessary for the ink to absorb selected wavelengths and pass significant fractions of the remaining wavelengths in order to produce an image with the correct colors.

When projected from a transparency, the deposited hot melt transparent colored image tends to project gray or black images because of any of three loss mechanisms, i.e., refractive scattering of transmitted light by the curved surface portions, surface losses resulting from microroughness (frosting) on the order of one micron, and bulk losses resulting from the formation of crystals within the droplet which have a different index of refraction than the other material in the droplet. The curved surface portions resulting from the three-dimensional ink spots refract light which passes through them away from the path to the projection lens so that they cast gray shadows in projection irrespective of the color of the ink which forms the image. In addition, an ink region containing an irregular surface is subject to poor adhesion, abrasion and chipping, as described in application Ser. No. 07/202,488 and in U.S. Pat. No. 4,751,528.

Flattening of the top surface portions of each of the individual ink drops on a transparent substrate in an attempt to overcome these problems is described in the published European Patent Application No. 0 308 117 and the corresponding U.S. Pat. No. 4,853,706. As described therein, each of the ink drops is subjected to pressure and/or heat in such manner that the top surface of the ink drop is flattened to provide a substantially planar region over at least 20%, and preferably 50% or 75% of the area of the support covered by the drop.

As shown in these publications, the remaining 25% to 80% of the area of each drop consists of curved surfaces and the thickness of each drop varies by up to 25%. These curved surfaces of the drop, in fact, have a greater curvature than the curvature of the original ink drop. As a result, in regions of ink patterns containing adjacent contiguous ink drops intended for 100% solid-area coverage, a substantial proportion of the light incident on the region is deflected by the remaining curved surface portions of the ink drops.

Moreover, the resulting irregular surface contributes to the tendency of the ink to crack, peel, abrade, flake and chip from the surface of the substrate. In one embodiment described in these publications, this tendency is counteracted by laminating a transparent adhesive layer over the ink drops before they are flattened, but this does not alleviate the light deflection problem resulting from the relatively large proportion of curved surface areas in the regions intended for 100% solid-area coverage.

For naturally amorphous (noncrystalline) materials, the microroughness (frosting) and bulk losses are small, i.e., the spots are glassy and "clear". Unfortunately, as is known in the art, the organic materials which are amorphous and which may be fluid enough to jet at temperatures of 100° C. to 160° C. tend to be very soft at room temperature. Consequently, the durability of the ink on a transparency may be inadequate. Generally, inks which have adequate hardness and which are jettable at temperatures of 100° C. to 160° C. are usually crystalline to a significant extent. Such high crystallinity produces light transmission losses and causes "opacity" of the ink drop. The bulk losses and surface roughness, i.e., frosting, are also a result of the ordered arrangement of the molecules into a plurality of randomly or obliquely oriented or disoriented crystals. Hence crystalline inks tend to have a high degree of surface and bulk scattering, producing light transmission losses greater than 50%, so as to project "gray" spots rather than spots with high color purity. On the other hand, such inks are generally suitable for black-and-white transparencies.

When transparent subtractive color hot melt ink images are printed on opaque substrates such as paper to provide colored reflection prints, they are subject to the same deficiencies since the light passes through the curved surface portions and any losses resulting from diffraction or scattering tend to degrade the image.

SUMMARY OF THE INVENTION

Accordingly, it is an object of the present invention to provide a new and improved process for treating transparent colored hot melt ink images in which the above-mentioned disadvantages are overcome.

Another object of the invention is to provide a new and improved method for treating colored hot melt ink projection transparencies which produces transparencies having improved characteristics.

These and other objects of the invention are attained by reorienting the surface of a region containing adjacent drops of a previously printed colored hot melt ink image having contiguous curved surface portions resulting in nonuniform thickness to provide a region with a continuous ink layer having a substantially uniform thickness so as to transmit light in a substantially rectilinear manner. The reorienting of the surface may be accomplished by appropriate burnishing, pressing or heating of the surface or by a combination of those procedures. In one embodiment, the reorienting is effected by pressing an adjacent surface against the nonuniform-thickness image region having curved surfaces, with or without heat, so as to cause the adjacent curved surface portions of nonuniform thickness to flow under pressure and produce a continuous layer having substantially uniform thickness. If the adjacent surface is the surface of a transparent sheet material, the sheet may be permanently affixed to the ink image and the substrate or, if desired, it may be removed after the ink surface has been reoriented to provide a continuous layer of substantially uniform thickness.

In another embodiment, the reorienting is effected by passing the image region and the adjacent substrate between a pair of rollers, with or without heating, under sufficient pressure to cause the curved surface portions of nonuniform thickness to flow into a continuous layer of uniform thickness. Preferably, the rollers are flexible and one of them is resiliently supported to assure proper reorientation of ink layers of differing thickness.

In yet another embodiment of the invention, the image region is retained above the melting point of the hot melt ink for a length of time sufficient to cause the adjacent curved surface portions to melt and flow together so as to reorient the surface and provide a continuous ink region having uniform thickness, after which the ink is solidified by cooling. Preferably, the ink image is retained above the melting point of the ink for a period of at least 0.5 second, and desirably from about 1 second to about 5 seconds. By reheating the colored hot melt ink image after it has been initially formed and solidified, the temperature of the ink and the time during which it is at a given temperature may be controlled in the desired manner without being influenced by possibly varying rates of heat input during formation of the ink image or by pauses in the printing operation which may be caused by interruptions in data transmission to the printer.

After the desired reorienting of the ink surface has been effected, the molten ink image is cooled, preferably at a rapid rate, i.e., quenched, to prevent crystallization and frosting of the ink drops which could degrade the projected image by bulk and surface scattering of the light transmitted by the ink drops. For ink which may crystallize or cause frosting, such quenching should occur at a rate of at least about 50° C. per second, and preferably at least 100° C. per second, through the temperature range from above the melting temperature of the ink to below the melting temperature of the ink.

The resulting colored ink image according to the invention comprises a substrate having one or more solid area regions of transparent ink in a continuous layer of uniform thickness through which light is transmitted in a rectilinear manner. If the region is composed of two or more inks, the layer will be thicker than a layer consisting of a single ink, but it must still have a substantially uniform thickness so as to transmit light in a rectilinear fashion and provide a projected image having clear, saturated colors. In addition, such layers of substantially uniform thickness provide improved adhesion to the substrate. Moreover, quenching of the ink in the layer after remelting assures reduced scattering and absorption due to crystallization and frosting so that a large proportion of the desired wavelengths of the light pass through the ink without diffraction or scattering.

When the adjacent curved surface portions of a region of transparent hot melt ink in a colored hot melt ink image are reoriented to provide a layer of uniform thickness in accordance with the invention, the color lightness (L*) and chroma (C*) are substantially improved for each of the subtractive colors and the L* value is reduced for black image portions.

BRIEF DESCRIPTION OF THE DRAWINGS

Further objects and advantages of the invention will be apparent from a reading of the following description in conjunction with the/accompanying drawings in which.

DESCRIPTION OF PREFERRED EMBODIMENTS

In conventional transparency projectors, the transparency-illuminating optics are usually arranged with a reflector and a collecting lens so that light is transmitted through the transparency in approximately parallel rays, producing an image of the light source in the plane of the projection lens. In this way, except for light which has been scattered in other directions during its passage through the transparency and the illuminating system, substantially all of the illuminating light is collected by the projection lens so as to be useful in forming a projected image. If a substantial proportion of the light passing through each ink region in a colored transparency image is scattered or absorbed, the image projected by the projection lens will be deficient in contrast and color saturation, providing a generally gray, washed-out appearance.

Figure 1:
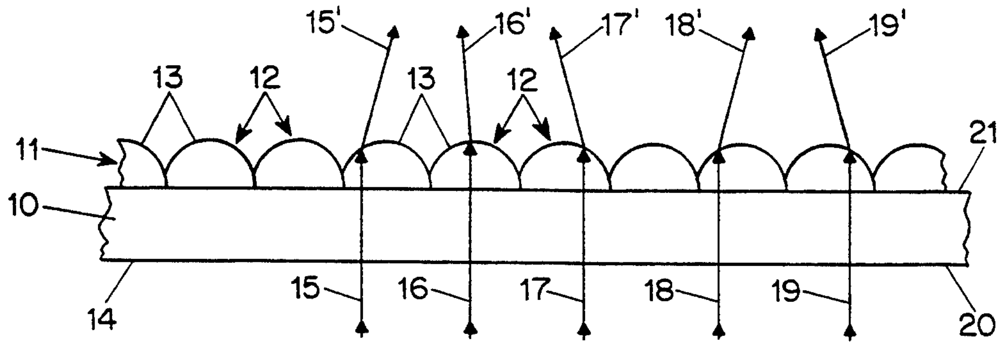
FIG. 1 is a schematic fragmentary sectional view illustrating the scattering of light transmitted through a portion of a hot melt ink jet image in a transparency having an ink region containing curved surface portions.

As described in the Fulton et al. U.S. Pat. No. 4,873,134, when an ink image is formed on a surface which cannot absorb the ink, such as when transparent hot melt ink is used to make an image on a polyester sheet material, each separate ink drop solidifies in the form of a three-dimensional spot which has a curved surface similar to the surface of a sphere with a radius of, for example, about 3 to 4 mils and contact angles of about 30° to 40° . Adjacent ink spots in an ink image portion with solid area coverage run together at the edges but the upper surface retains curved surface sections corresponding to the shape of the drops used to form the image. A typical solid area region produced in this manner is illustrated in FIG. 1, in which a transparent substrate 10 has a solidified ink region 11 consisting of a series of adjacent ink drops 12 which form a substantially continuous layer of ink. Each drop has a generally hemispherical shape and, when disposed in abutting relation, the drops tend to retain the spherical surface configuration of their upper surface portions 13.

In a projection system of the type mentioned above, the transparency is illuminated from the side 14 opposite the layer 11 by substantially parallel rays of light 15-19, which, in the example shown in FIG. 1, are incident in a direction approximately perpendicular to the surfaces 20 and 21 of the sheet 10.

If the projection lens used in the transparency projection system has an aperture of f/4, which is about the maximum aperture normally used in such systems, the projection lens will subtend an angle of about 14.4° from each point in the image being projected. Thus, if any ray directed toward the projection lens is deviated by more than 7.2° from the line extending between the center of the projection lens and the point being imaged, it will not be collected by the projection lens and will not be useful in forming an image.

Because the curved surface portions 13 in the upper surface of the layer 11 refract the rays 15-19 at different angles depending upon the angle of the surface portions through which the ray passes resulting in corresponding deflected rays 15'-19'. Many of those rays will be deflected by angles greater than 7.2°. Consequently, a large proportion of the light will be deflected away from the projection lens in the manner describe in U.S. Pat. No. 4,873,134, causing the projected image of the region 11 to appear gray. Moreover, if the top surface portion of each curved surface region is flattened, as described in the published European Application No. 0 308 117, the flattened central portion of each drop will transmit light without deviation so that it will be received by a projection lens, but the portions surrounding the flattened portion have even greater curvature than before, causing greater deflection of incident light in those regions. Thus, the flattening of drops as described in European Application No. 0 308 117 does not eliminate the loss of light which causes a gray appearance in the projected image. Furthermore, the irregular upper surface produced by adjacent ink spots, even with flattened surface portions, has a relatively low resistance to abrasion.

Figure 2:
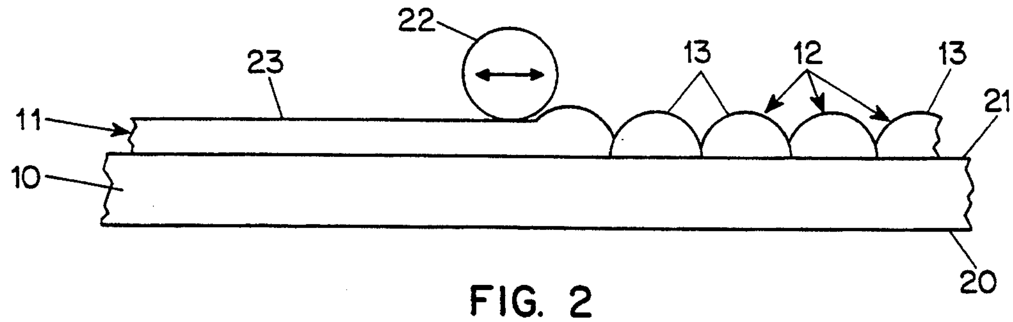
FIG. 2 is a schematic fragmentary sectional view of the image region shown in FIG. 1 illustrating reorientation of the surface of the image region in accordance with one embodiment of the present invention, to provide a transparent subtractive color hot melt ink layer of uniform thickness.
Figure 3:
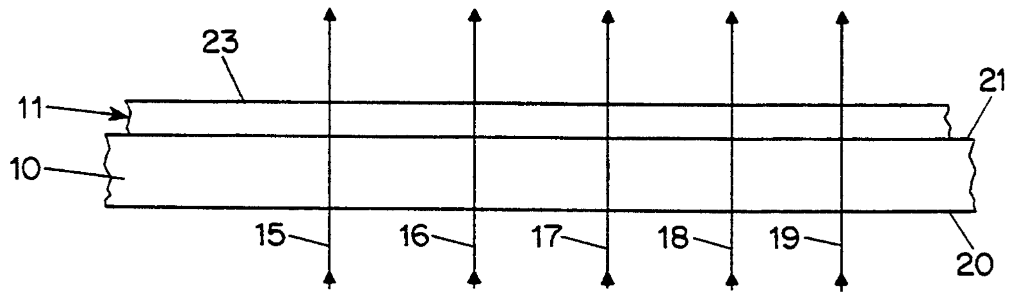
FIG. 3 is a schematic fragmentary sectional view of the image region shown in FIG. 1 after reorientation of the surface.

To overcome such problems in accordance with the invention, the curved surface portions 13 of the layer 11 are reoriented to provide a layer of substantially uniform thickness so as to substantially eliminate any deflection of parallel rays 15-19 as they pass through the layer. In accordance with one embodiment illustrated in FIG. 2, the rounded surface region 13 of the adjacent drops are burnished to flatten them by rubbing the surface with a curved-surface member 22 to produce a layer of substantially uniform thickness having a surface 23 substantially parallel to the surface 21. During the rubbing step, the curved-surface member 22 may be kept rotationally fixed or it may be rotationally driven at a low speed or at a high speed. As shown in FIG. 3, such burnishing removes the curved surfaces of the ink, providing a layer of substantially uniform thickness permitting the light rays 15,16,17 to pass through the ink layer 11 in a rectilinear fashion. As a result, all of the transmitted light is collected by a projection lens, producing a projected image having clear, saturated colors.

Figure 4:
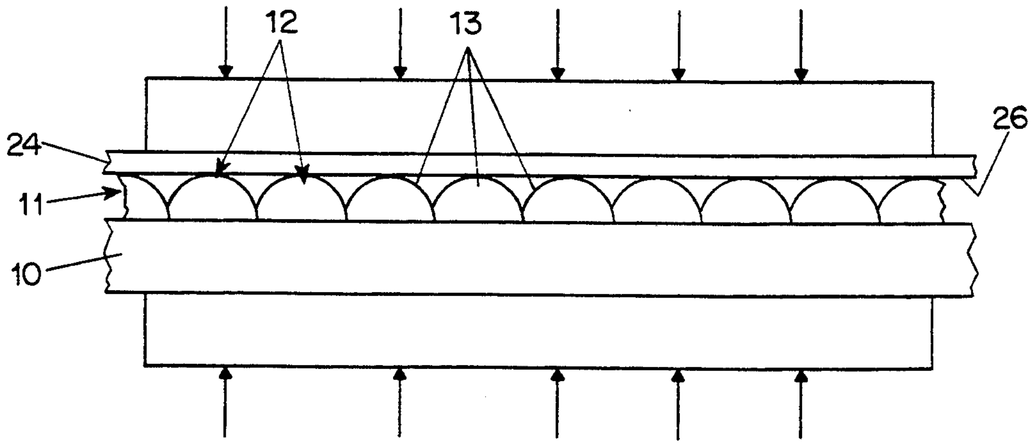
FIG. 4 is a schematic fragmentary sectional view of the image region shown in FIG. 1 illustrating reorientation of the surface of the region in accordance with a further embodiment of the invention.

In another embodiment shown in FIG. 4, a sheet 24 of transparent material such as Mylar is placed on the exposed surface of the ink layer 11 and is then subjected to pressure by a pressure plate 25 to cause the curved surface portions 13 to be reoriented to provide a layer of uniform thickness conforming to the contacting surface 26 of the sheet 24. If the ink is heated to a temperature below its melting point while the pressure is applied, the magnitude of the applied pressure may be reduced. Preferably, pressures in the range from about 20 psi to about 100 psi are applied at temperatures from about 3° C. to about 30° C., and preferably about 5° C. to about 20° C., below the melting point of the ink. If desired, the sheet 24 may be left in place. After such surface reorientation, the layer 11 has a substantially uniform thickness so that the parallel rays 15–19 pass through the image portion in a rectilinear manner, providing a projected image having clear, saturated colors. The uniform thickness of the ink layer, moreover, enhances the abrasion resistance of the layer.

Figure 5:
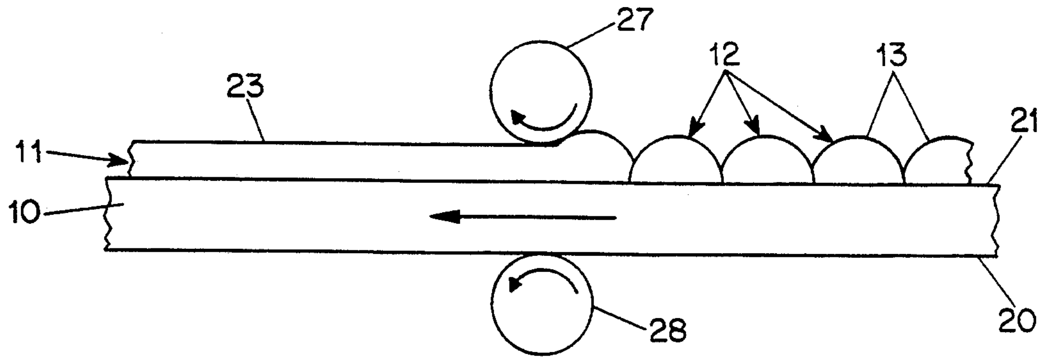
FIG. 5 is a schematic fragmentary sectional view of the image region shown in FIG. 1 illustrating reorientation of the surface of the region in accordance with yet another embodiment of the invention.

According to another embodiment of the invention, shown in FIG. 5, the curved surface portions 13 are reoriented to provide a layer of substantially uniform thickness by passing the support and the ink layer between two spaced rollers 27 and 28. If desired, either or both of the rollers 27 and 28 may be heated to a temperature slightly below the melting point of the ink to facilitate reorientation of the curved surface portions 13.

Figure 6:
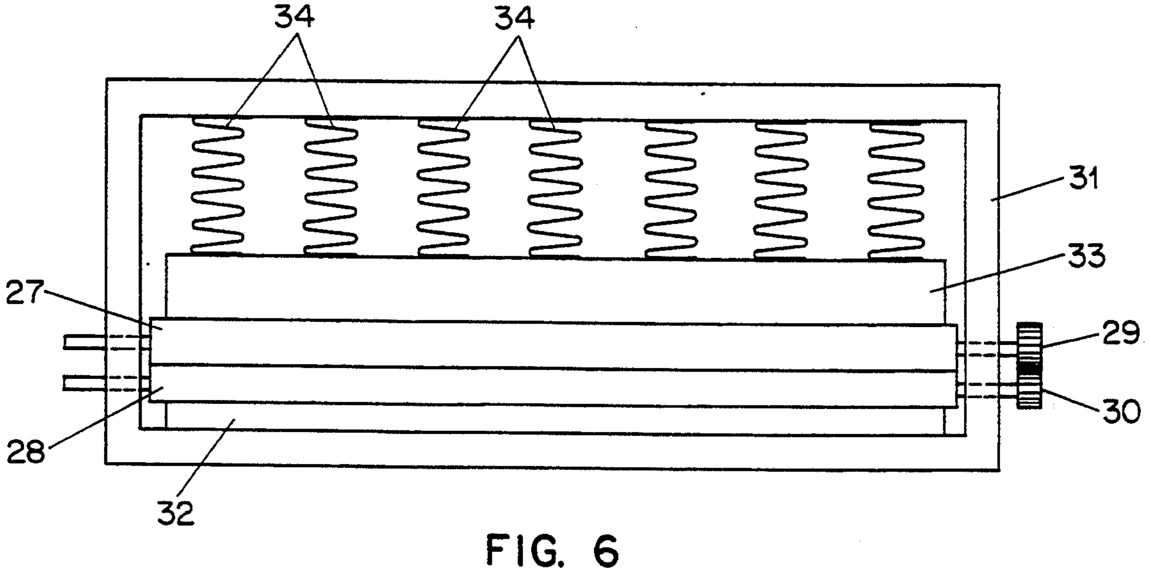
FIG. 6 is a schematic view in longitudinal section showing the surface-reorienting apparatus illustrated in FIG. 5.

Since subtractive color hot melt ink images are composed of layers of cyan, magenta and yellow inks which are combined to produce colors of intermediate hue or black, such transparencies may have regions with one, two or three layers of ink, as well as regions with no ink. If the rollers 27 and 28 were supported so as to maintain a fixed separation between them, which might be capable of reorienting the surface of a single layer of ink produced by adjacent ink drops of the same volume, those portions of the image containing two or three layers could not pass between the rollers without bending the rollers or destroying the image on the substrate. To overcome this difficulty, it is necessary to provide a constant-pressure roller arrangement rather than a constantseparation roller arrangement. This can be accomplished by using thin, flexible rollers and providing resilient support spaced along the length of the rollers as illustrated in FIG. 6. In this arrangement, the rollers 27 and 28 are linked by corresponding gears 29 and 30 and are supported for rotation in a frame 31. Each of the rollers is thin enough to respond flexibly to ink layers of varying thickness and the lower roller 28 is supported in a bed 32 of low-friction material such as Delrin to provide a fixed sliding support for the surface of that roller. To provide the desired surface-reorienting pressure for varying ink layer thicknesses, the upper roller 27 is backed by a flexible Teflon support 33 which is, in turn, supported by a series of spaced adjustable springs 34.

Figure 7:
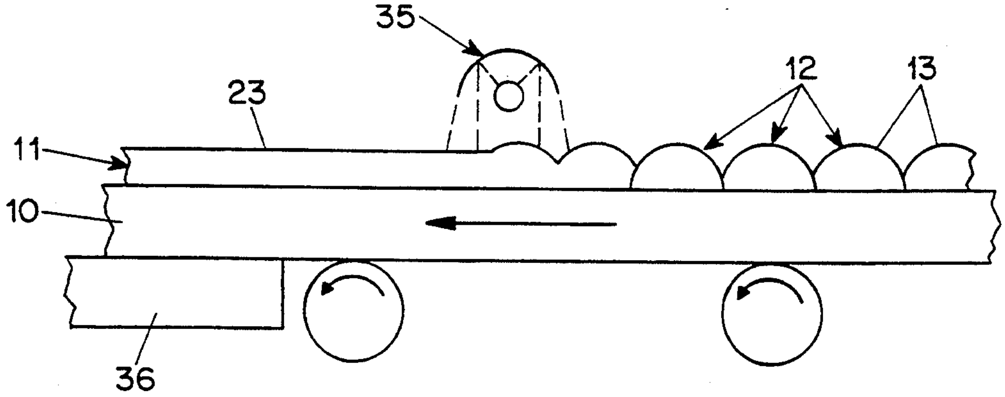
FIG. 7 is a schematic fragmentary sectional view of the image region shown in FIG. 1 illustrating reorientation of the surface of the region in accordance with still another embodiment of the invention.

A further embodiment of the invention, shown in FIG. 7, eliminates the problems encountered in the application of pressure to an ink image. In this embodiment, the ink image region 11 is heated above the melting point of the ink for a period of 0.5 to 10 seconds, and preferably 1 to 5 seconds, without application of pressure, to cause the curved ink surface portions 13 to flow so as to be reoriented to provide an ink layer having substantially uniform thickness. This procedure is preferably accomplished by moving the substrate 10 containing the ink region 11 continuously through a heatapplying region, for example, past a radiant heater 35, at a controlled rate so as to permit the adjacent curved surface portions 13 to become molten and flow to a level configuration as shown in FIG. 7.

In each case, the uniform thickness of the ink layer eliminates surface irregularities to reduce chipping and abrasion and provides improved adhesion of the ink to the substrate.

In the copending Spehrley Application Ser. No. 07/202,488 filed Jun. 3, 1988, for "CONTROLLED INK DROP SPREADING IN HOT MELT INK JET PRINTING" which is incorporated herein by reference, the characteristics of hot melt inks used in ink jet systems are described and it is noted that the melting point of such an ink is the point at which the specific heat, i.e., the heat input required per unit mass of ink to cause a unit temperature change, passes through a peak and that the viscosity of the ink decreases rapidly between that point and the liquidus point of the ink, i.e., the point at which the ink is entirely in liquid form. In order to provide the desired reorientation of curved surfaces 13 of the ink region 11 by remelting the ink to produce a layer of uniform thickness in accordance with this embodiment, the ink on the transparent substrate should be maintained above its melting point as thus defined, and preferably near or above the liquidus temperature, for a controlled period of time, for example, at least 0.5 seconds, so that surface tension and wetting forces can overcome viscous resistance to ink flow. The desired uniform-thickness layer can normally be attained by maintaining the temperature of the ink above its melting point, preferably about 5° C. to 40° C. above its melting point and most preferably about 10° C. to 30° C. above its melting point, for about 1 to 10 seconds and, preferably, 1 to 5 seconds.

Figure 8:
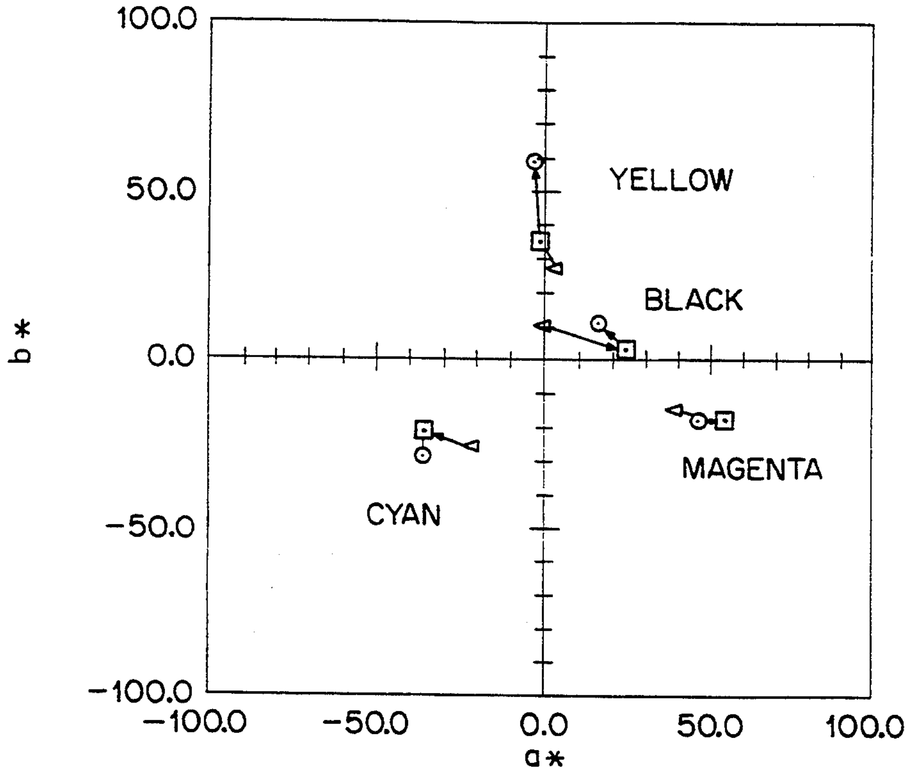
FIG. 8 is a graphical representation showing the changes in a* and b* for three subtractive color inks and black with different remelting temperatures.
Figure 9:
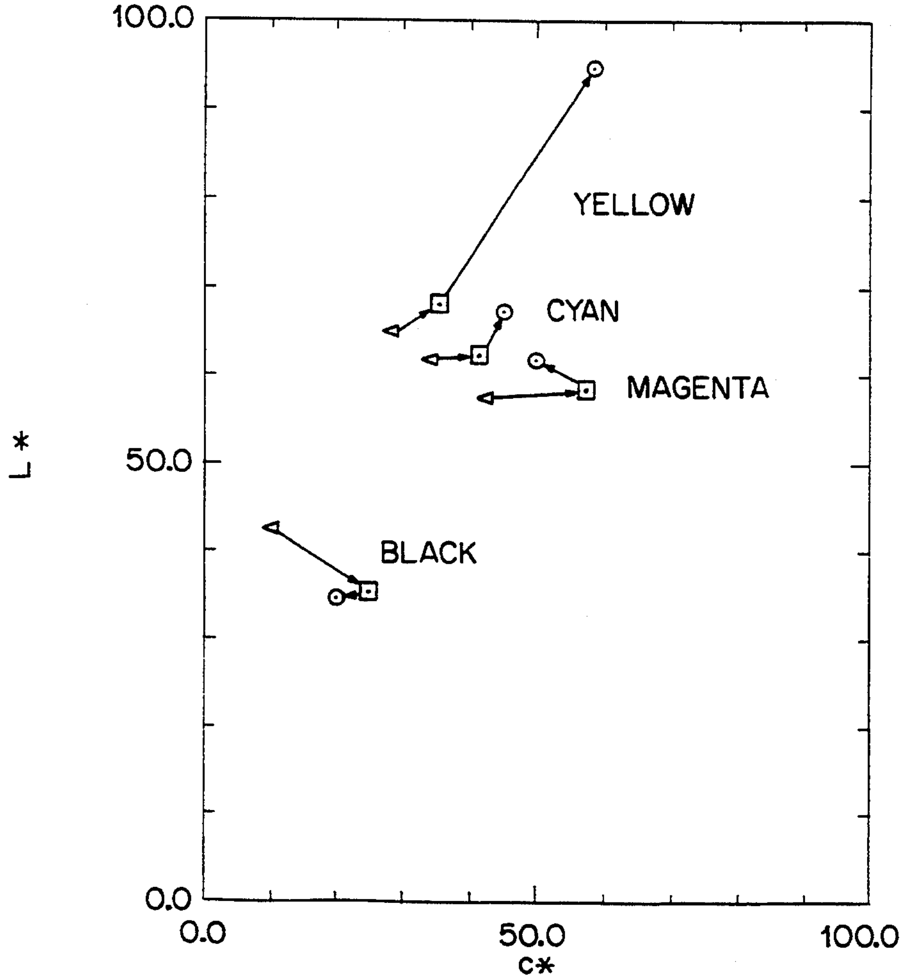
FIG. 9 is a graphical representation showing the changes in projected chroma (C*) and projected clarity (L*) for three subtractive color inks and black with different remelting temperatures.
Figure 10:
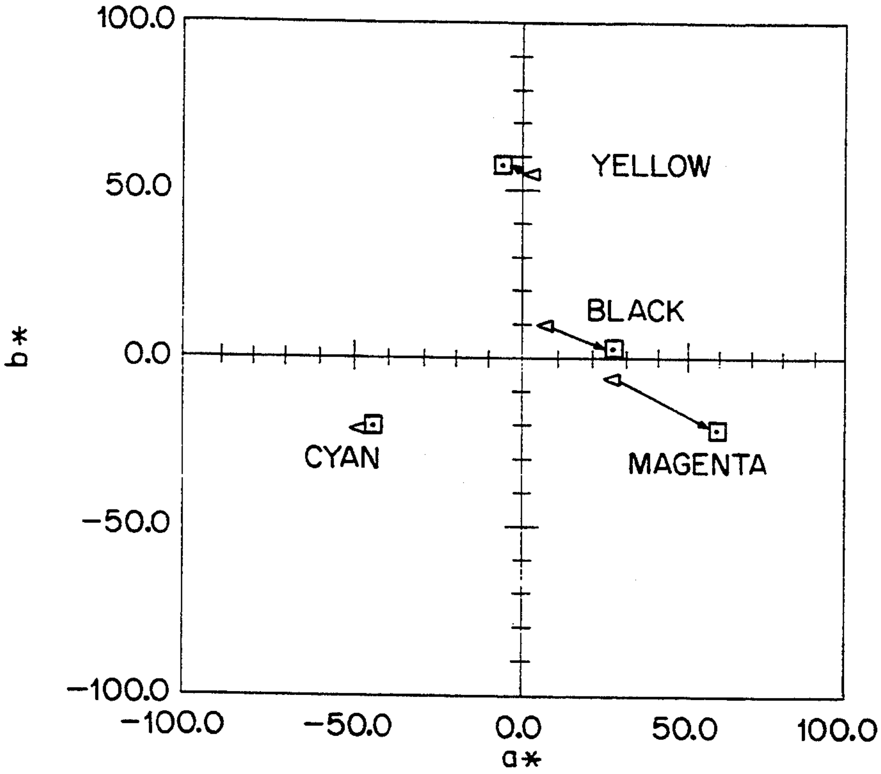
FIG. 10 is a graphical representation showing the changes in a* and b* for three subtractive color inks and black printed at elevated temperature and remelted at a higher temperature.
Figure 11:
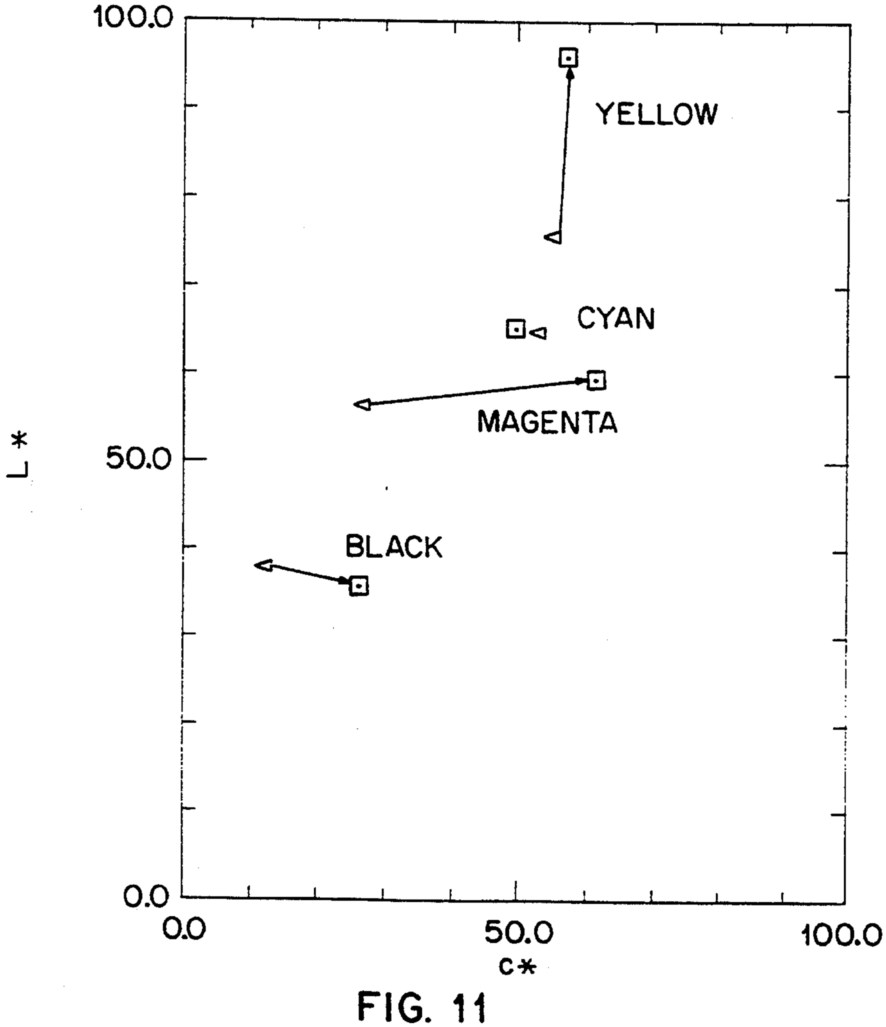
FIG. 11 is a graphical representation showing the changes in projected chroma (C*) and projected clarity (L*) for three subtractive color inks and black printed at elevated temperature and remelted at a higher temperature.

In particular instances, yellow, magenta, cyan and black ink layers 11 were printed on a transparent substrate maintained at 55°0 C. and then solidified. The resulting ink patterns were then remelted by maintaining them at temperatures of 75° C. and 95° C. for 5 seconds to reorient the surfaces of the ink layers and provide layers of uniform thickness as shown in FIG. 5. The changes in a* and b* with increased remelting temperatures are shown in FIG. 8, and the changes in L* and C* are shown in FIG. 9. As illustrated in FIG. 9, C* increased from 25 to 59 for yellow, from 35 to 45 for cyan, and from 42 to 50 for magenta. L* decreased from 43 to 35 for black. Similar ink patterns were printed on a transparent substrate maintained at 75° C. and, after solidification, the surfaces of these ink patterns were reoriented by maintaining them at 95° C. for 5 seconds. The changes in a* and b* are shown in FIG. 10 and the changes in L* and C* are shown in FIG. 11. As illustrated in FIG. 11, C* increased from 54 to 57 for yellow, from 27 to 62 for magenta, and from 9 to 53 for cyan, and L* decreased from 38 to 35 for black.

From these data it is apparent that reorienting the surface of an ink image by remelting the ink to provide layers of uniform thickness improves the color of the transparency, providing clearer, more saturated colors.

For transmission viewing of hot melt ink images, such as from projected transparencies, it is further important to avoid extensive crystallization of the ink in the ink spots which will produce internal scattering and absorption of the light rays within the ink spot and frosting. In accordance with one aspect of the invention, such crystallization and frosting, which occurs more frequently in some inks than in other inks, can be inhibited or reduced to acceptable levels by quenching, i.e., cooling the ink through its melting point. The greatest clarifying effect may be obtained by quenching from above the liquidus temperature to below the melting temperature, although varying improvement has been obtained when inks have been heated to and quenched from a temperature between the melting and liquidus temperatures. To increase quenching rates, it may be useful to quench toward a temperature which is 20° C. to 50° C. below the melting temperature. For good business presentation image quality, the light transmission losses caused by crystallinity and frosting of the ink drops should be less than 50% and preferably less than 35%. Best results are obtained when such losses are reduced to levels below 20%. Quenching rates of at least 50° C. per second and preferably at least 100° C. per second have been found effective for this purpose and best results have been obtained with quenching rates of 500° C. per second to 1000° C. per second.

Moreover, while it is possible to maintain the ink jetted onto a substrate in molten condition at a selected temperature for the desired time immediately after the image is formed and then quench, it is preferable to print the ink image on a substrate and subsequently reheat the image for the time required to permit surface reorientation and then quench the ink in the layer by rapid cooling, as described above. In that case, the platen temperature used in the printing of the image is preferably maintained at a low enough level, such as 55° C. to 65° C. to inhibit surface reorientation during the printing of the image and, after the image has been printed, the transparent sheet is reheated to a temperature of, for example, 10° C. to 30° C. above the melting point and maintained for 1 to 5 seconds to allow the necessary surface reorientation and then cooled to a temperature of, for example, 50° C. in a fraction of a second.

For this purpose, the transparent sheet containing the printed image is preferably passed through a separate remelt/quench path having a heating element 35 or a heated platen maintained at a controlled temperature of, for example, 85° C. to 95° C. to remelt the ink image and providing a residence time long enough to maintain the ink in molten condition for about 3 seconds, for example. Immediately thereafter, the transparency moves into contact with a quenching platen maintained, for example, at less than 40° C. With certain inks having a liquidus temperature in the range of 87° C. to 92° C., a melting point in the range of 55° C. to 75° C. and a solidus point in the range of 32° C. to 36° C., ink images having substantially reduced transmission losses resulting from crystallization and frosting have been produced by this procedure.

The substrate 10 may be made of any conventional transparent sheet material which is wetted by the ink in the ink region 11. One such material is the transparency substrate marketed by the 3M Company with the designation 688, which has been found to provide completely satisfactory colored ink images.

Although the invention has been described herein with reference to specific embodiments, many modifications and variations of the invention will be obvious to those skilled in the art. For example, hot melt colored ink transparency images made by techniques other than ink jet printing, such as thermal transfer printing or the like, which may be subject to one or more of the shortcomings discussed above, may be improved by the use of the invention described herein. Accordingly, all such variations and modifications are included within the intended scope of the invention.

We claim:

1. A method for producing a phase-change ink printed substrate, which comprises:

providing a substrate;

applying to at least one surface of said substrate a predetermined pattern of a light-transmissive phase-change ink which transmits light in a nonrectilinear path; and forming a layer of light-transmissive phase-change ink printed on said substrate in which said pattern of solidified phase-change ink has been reoriented and said ink layer has a substantially uniform thickness and transmits light in a substantially rectilinear path.

2. The method of claim 1, which includes the further step of providing a light-transmissive substrate, wherein said reoriented printed substrate transmits light in a substantially rectilinear path for enabling the use of said reoriented printed substrate in a projection device to project an image containing clear, saturated colors.

3. The method of claim 1, which further includes the step of providing an ink composition comprising a subtractive primary-colored phase-change ink composition.

4. The method of claim 1, wherein said ink layer on said printed substrate is substantially abrasion-resistant subsequent to reorientation.

5. The method of claim 1, wherein the $C^*_{ab}$ value of said reoriented ink layer comprises a subtractive primary yellow color of at least about 40.

6. The method of claim 1, wherein the $C^*_{ab}$ value of said reoriented ink layer comprises a subtractive primary magenta color of at least about 62.

7. The method of claim 1, wherein the $C^*_{ab}$ value of said reoriented ink layer comprises a subtractive primary cyan color of at least about 30.

8. The method of claim 1, wherein the $L^*$ value of said reoriented layer comprises a black color of not more than about 35.

9. The method of claim 1, including reorienting the pattern of solidified phase-change ink by applying pressure to the surface of the ink in the pattern.

10. The method of claim 9, including passing the substrate with the applied pattern of phase-change ink between opposed rollers.

11. A method according to claim 10 wherein one of the opposed rollers is resiliently biased toward the other roller.

12. A method according to claim 10 wherein at least one of the opposed rollers is sufficiently flexible to conform to variations in the thickness of the ink in the pattern.

13. A method according to claim 12 including a plurality of spaced spring members supporting the flexible roller at spaced locations along its length.

14. The method of claim 1, including reorienting the pattern of phase-change solidified ink by heating it above the melting point of the ink for at least 0.5 seconds.

15. The method of claim 14, including cooling the molten ink in the pattern at a rapid rate following reorientation.

16. The method of claim 15, including cooling the molten ink at a rate of at least 50° C. per second.

17. A method for reorienting a phase-change ink printed substrate which comprises:

providing a substrate having on at least one of its surfaces a pattern of a light-transmissive phase-change ink which transmits light in a nonrectilinear path; and forming on said substrate, in a controlled manner from said phase-change ink pattern, a layer of phase-change ink having a substantially uniform thickness which transmits light in a substantially rectilinear path.

18. The method of claim 17, which includes the further step of providing a light-transmissive substrate which is substantially light-transmissive, said formed printed substrate transmitting light in a substantially rectilinear path, thereby enabling the use of said formed printed substrate in a projection device to project an image containing clear, saturated colors.

19. The method of claim 17, which further includes the step of providing said ink composition comprising a subtractive primary-colored phase-change ink composition.

20. The method of claim 17, wherein the $C^*_{ab}$ value of the subtractive primary yellow color of said formed ink layer is at least about 40.

21. The method of claim 17, wherein the $C^*_{ab}$ value of the subtractive primary magenta color of said formed ink layer is at least about 62.

22. The method of claim 17, wherein the $C^*_{ab}$ value of the subtractive primary cyan color of said formed ink layer is at least about 30.

23. The method of claim 17, wherein the L* value of said reoriented layer comprises a black color of not more than about 35.

24. The method of claim 17, wherein the increase in the $C^*_{ab}$ value of the subtractive primary yellow color of said formed ink layer, as compared to the $C^*_{ab}$ value of the subtractive primary yellow color of said original ink layer which is not of a uniform thickness and has not been reoriented, is at least about 20.

25. The method of claim 17, wherein the increase in the $C^*_{ab}$ value of the subtractive primary magenta color of said formed ink layer, as compared to the $C^*_{ab}$ value of the subtractive primary magenta color of said original ink layer which is not of a uniform thickness and has not been reoriented, is at least about 35.

26. The method of claim 17, wherein the increase in the $C^*_{ab}$ value of the subtractive primary cyan color of said formed ink layer, as compared to the $C^*_{ab}$ value of the subtractive primary cyan color of said original ink layer which is not of a uniform thickness and has not been reoriented, is at least about 10.

27. The method of claim 17, wherein said ink layer on said substrate is substantially abrasion-resistant subsequent to forming said uniform-thickness layer.

28. A light-transmissive phase-change ink printed substrate, which comprises:

a substrate; and a layer of light-transmissive phase-change ink printed in a predetermined pattern on at least one surface of said substrate and having a substantially uniform thickness which transmits light in a substantially rectilinear path.

29. The printed substrate of claim 28, wherein said ink layer has been reoriented subsequent to its application to said substrate.

30. The printed substrate of claim 28, wherein said printed substrate transmits light in a substantially rectilinear path thereby enabling the use of said printed substrate in a projection device to project an image containing clear, saturated colors.

31. The printed substrate of claim 30, wherein said ink layer has been reoriented subsequent to its application to said substrate.

32. The printed substrate of claim 28, said ink layer of which is substantially abrasion-resistant.

33. The printed substrate of claim 28, wherein said ink composition comprises a subtractive primary-colored phase-change ink composition.

34. The printed substrate of claim 28, wherein the $C^*_{ab}$ value of the subtractive primary yellow color of said ink layer is at least about 40.

35. The printed substrate of claim 28, wherein the $C^*_{ab}$ value of the subtractive primary magenta color of said ink layer is at least about 62.

36. The printed substrate of claim 28, wherein the $C^*_{ab}$ value of the subtractive primary cyan color of said ink layer is at least about 30.

37. The printed substrate of claim 28, wherein the L* value of the black color of said ink layer is not more than about 35.

38. The printed substrate of claim 29, wherein the increase in the $C^*_{ab}$ value of the subtractive primary yellow color of said reoriented ink layer, as compared to the $C^*_{ab}$ value of the subtractive primary yellow color of an ink layer which is not of a uniform thickness and has not been reoriented, is at least about 20.

39. The printed substrate of claim 29, wherein the increase in the $C^*_{ab}$ value of the subtractive primary magenta color of said reoriented ink layer, as compared to the $C^*_{ab}$ value of the subtractive primary magenta color of an ink layer which is not of a uniform thickness and has not been reoriented, is at least about 35.

40. The printed substrate of claim 29, wherein the increase in the $C^*_{ab}$ value of the subtractive primary cyan color of said reoriented ink layer, as compared to the $C^*_{ab}$ value of the subtractive primary cyan color of an ink layer which is not of a uniform thickness and has not been reoriented, is at least about 10.

* * * * *